(12) United States Patent
Honary

(10) Patent No.: US 11,691,801 B2
(45) Date of Patent: Jul. 4, 2023

(54) APPARATUS AND PROCESS FOR INCORPORATION OF SUSCEPTORS INTO VESSELS

(71) Applicant: Environmental Lubricants Manufacturing, Inc., Grundy Center, IA (US)

(72) Inventor: Lou A. T. Honary, Cedar Falls, IA (US)

(73) Assignee: ENVIRONMENTAL LUBRICANTS MANUFACTURING, INC., Grundy Center, IA (US)

( * ) Notice: Subject to any disclaimer, the term of this patent is extended or adjusted under 35 U.S.C. 154(b) by 392 days.

(21) Appl. No.: 16/924,699

(22) Filed: Jul. 9, 2020

(65) Prior Publication Data

US 2021/0009337 A1 Jan. 14, 2021

Related U.S. Application Data

(60) Provisional application No. 62/872,000, filed on Jul. 9, 2019.

(51) Int. Cl.
*H05B 6/80* (2006.01)
*H05B 6/64* (2006.01)
*B65D 81/34* (2006.01)
*B01J 19/12* (2006.01)

(52) U.S. Cl.
CPC ........ *B65D 81/3446* (2013.01); *B01J 19/126* (2013.01); *B65D 2581/3471* (2013.01); *B65D 2581/3494* (2013.01); *H05B 6/80* (2013.01)

(58) Field of Classification Search
CPC ............... G11C 17/18; B01J 19/126; B01J 2208/00442; B01J 2219/00141; B65D 2581/3471; B65D 2581/3494; B65D 81/3446; H05B 6/6491; H05B 6/80
USPC ....... 219/730, 725, 726, 727, 680, 751, 754, 219/756, 759, 765; 426/107, 111, 234, 426/241, 243, 109, 110, 113; 99/DIG. 14; 118/725, 728, 730, 719, 118/723 E, 500
See application file for complete search history.

(56) References Cited

U.S. PATENT DOCUMENTS 5,081,330 A * 1/1992 Brandberg ......... B65D 81/3897
426/243
7,112,769 B2 * 9/2006 Del Regno .............. H05B 6/80
219/759

FOREIGN PATENT DOCUMENTS

GB 2140277 A * 11/1984 ............ A47J 36/02
WO WO-2006131755 A1 * 12/2006 ............ H05B 6/802

* cited by examiner

*Primary Examiner* — Quang T Van
(74) *Attorney, Agent, or Firm* — Shuttleworth & Ingersoll, PLC; Brett Papendick

(57) ABSTRACT

A process and apparatus for heating a microwave transparent material or di-polar material. The apparatus includes a vessel that has susceptor material on at least a portion of the vessel walls. Microwaves are generated by a microwave transmitter and introduced into the vessel which can heat both microwave transparent materials and di-polar materials within the vessel.

17 Claims, 3 Drawing Sheets

(12) United States Patent

APPARATUS AND PROCESS FOR INCORPORATION OF SUSCEPTORS INTO VESSELS

CROSS-REFERENCE TO RELATED APPLICATIONS

The present application claims priority to provisional patent application 62/872,000 which was filed on Jul. 9, 2019, and is hereby expressly incorporated by reference in its entirety.

BACKGROUND OF THE INVENTION

Microwaves can be applied to non-ferromagnetic vessels to process a variety of products including lubricants, greases, and food products. Heating is most effective when the products being heated are di-polar. Microwaves apply an electric field and a magnetic field to the materials to be heated. The magnetic field of microwaves interacts with di-polar materials creating more effective excitation that results in frictional heat. This excitation is weaker in poly-polar materials and in some products the excitation is rather minimal. Some materials are considered microwave transparent because of the extreme weak response to the magnetic field of microwaves. Accordingly, the materials do not heat well when subjected to microwaves. The present invention incorporates means in which microwaves can be used to universally heat products regardless of their polarity.

An earlier U.S. Pat. No. 8,962,542-B2 by Honary and James, incorporated microwaves to metallic vessels for processing grease. Application of microwaves to products inside a metallic vessel has been considered a breakthrough in processing technology. A subsequent provisional patent application by Honary, Zaher Soleimani, Scheurs, and Erickson (Application No. 62/801,860) revised the original process to apply microwaves from the bottom of vessels instead of the top of vessels, thus reducing the dangers of arcing hazards in the vessels.

SUMMARY OF THE INVENTION

The current invention incorporates the use of susceptors within the vessels to facilitate the heating of microwave transparent materials. A susceptor is a material used for its ability to absorb the electromagnetic energy of microwaves and convert it to heat and to infrared thermal energy that is also re-emitted as infrared thermal radiation. Susceptance is considered an electrical property of materials that reflects their tendency to convert electromagnetic energy to thermal energy.

Susceptors respond to microwave excitation, however, their size and materials need to be selected for the particular application. In the current invention, the susceptor materials are incorporated inside the vessels utilized to hold the materials to be heated and/or mixed. When microwave transparent materials are in the vessel, then the susceptor is activated to heat the product. If di-polar materials are in the vessel, those di-polar materials absorb the magnetic energy of the microwaves thus rendering the presence of the susceptor inconsequential.

The current state of microwave heating as presented in previous patents limit the efficient use of microwaves to heating di-polar materials only. The present invention when incorporated in microwave-based vessels will make microwaves a universal heating source of products regardless of their polarity.

The process of application of susceptors to vessels can be accomplished through many well-established processes including chemical bonding with the use of adhesive materials as used in manufacturing sandpapers. Many of the materials used for manufacturing sandpapers including aluminum oxide or silicon carbide are also known for effective susceptors. The use of chemical bonding is more economical and could be used in application with moderate heating with no scraped surface agitation.

Other methods will apply high speed burning gasses or plasma to the surface to be treated while the susceptor materials in the form of powder are fed into the passing flame. The susceptor materials would melt in the high temperature burning gas and when impacted on the target surface they form a metallic bond akin to welding to the surface. This technology is mature, and experts can apply different grain size of the susceptor at different thickness uniformly to parts and surfaces of varied shapes.

FIGS. 5-6 demonstrate that oils (PAO) having susceptors (SiC) added to them makes the mixture heat up at a greater rate.

DETAILED DESCRIPTION OF THE INVENTION

Figure 1:
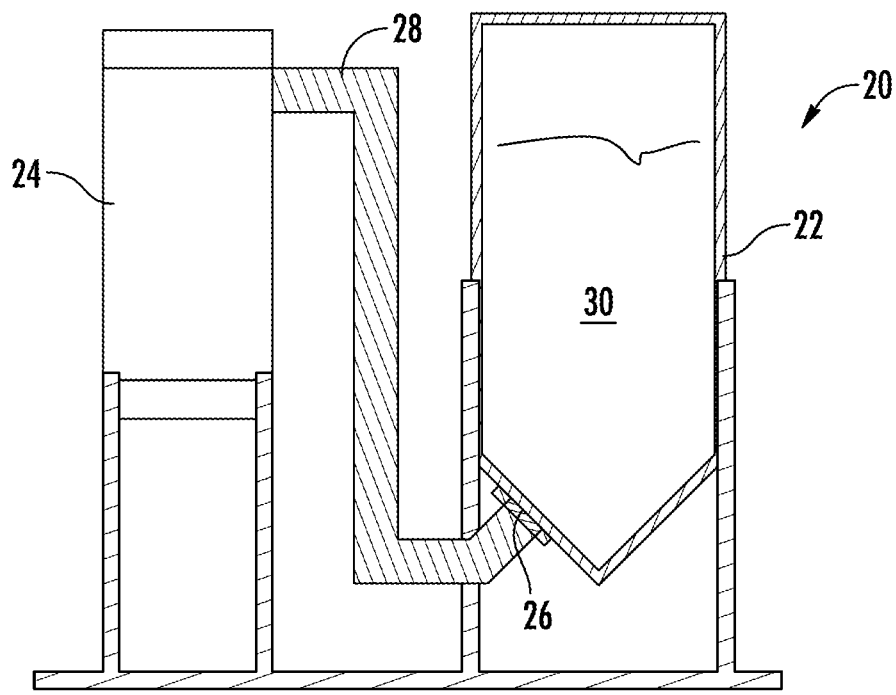
FIG. 1 is a schematic of the current state of the art with the waveguides attached to the bottom of the vessel.

Now referring to the figures, FIG. 1 shows the current state of the art of an apparatus 20 for heating materials via microwaves. The apparatus 20 has a vessel 22 for holding materials 30 that require heating. The heating is supplied by a microwave transmitter 24. The microwaves enter the vessel 22 through a microwave transparent barrier 26. A waveguide 28 can be utilized to link the microwave transmitter 24 to the vessel 22. Given that some materials 30 that need to be heated are not affected by microwaves, the current state of the art apparatus 20 cannot be used for heating such materials or is inefficient to heat such materials.

Figure 2:
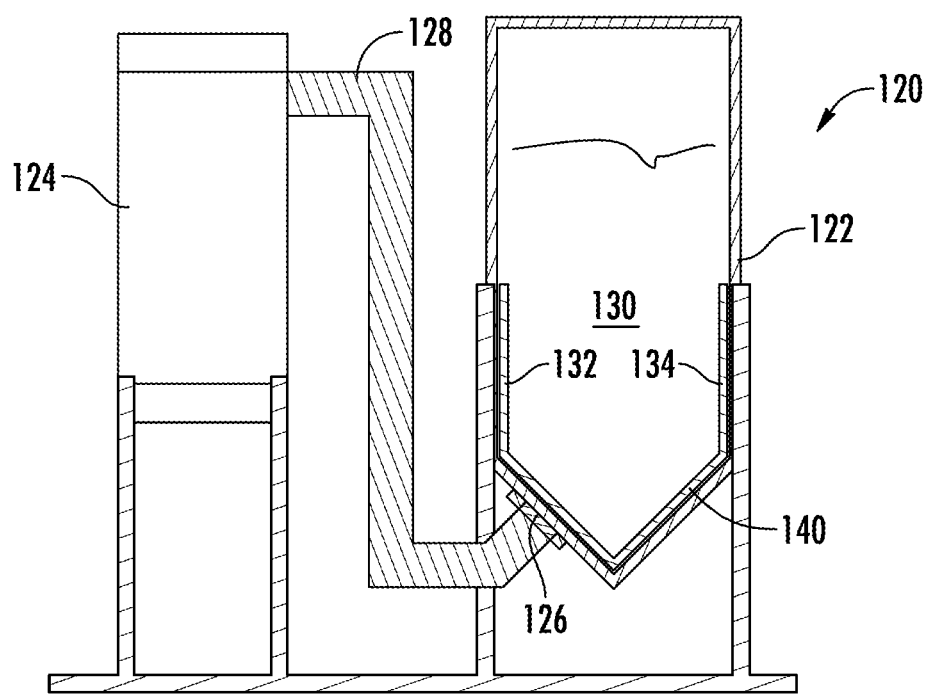
FIG. 2 is a first embodiment of a vessel with a portion of the vessel walls coated with a susceptor material.
Figure 3:
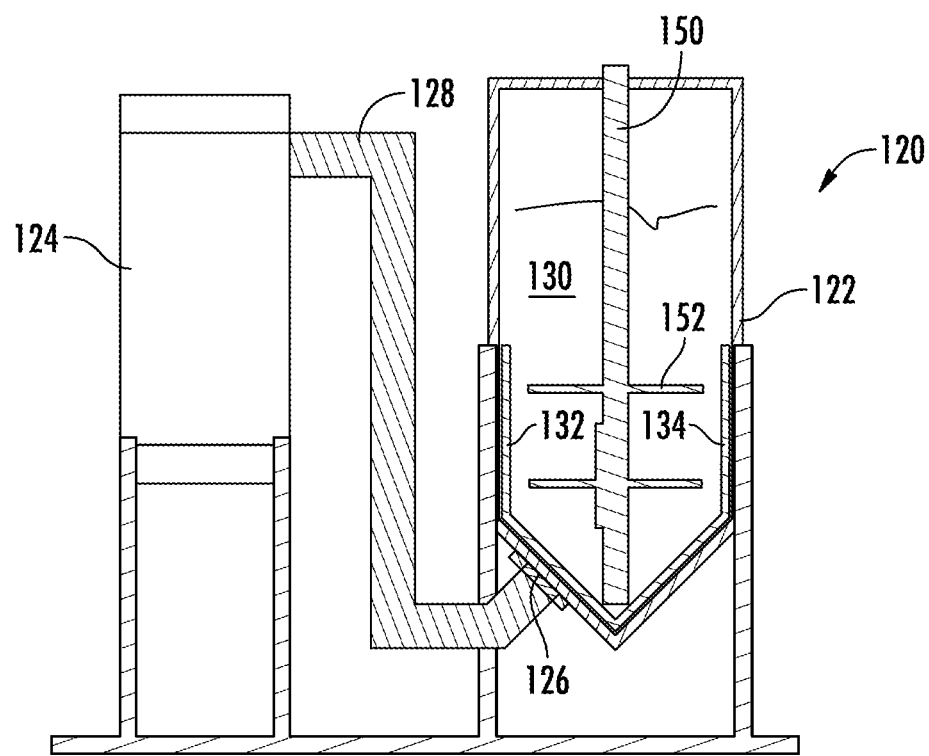
FIG. 3 is a second embodiment of a vessel with a portion of the vessel walls coated with a susceptor material and scraped surface mix arms, propeller type mixers, sweep agitation and other methods of mixing to be coated with a susceptor material.

FIG. 2 shows an apparatus 120 for heating materials via microwaves. The apparatus 120 has a vessel 122 for holding materials 130 that require heating. The heating is supplied by a microwave transmitter 124. The microwaves enter the vessel 122 through a microwave transparent barrier 126. A waveguide 128 can be utilized to link the microwave transmitter 124 to the vessel 122.

The vessel 122 has an interior surface 132 which can be coated with a susceptor material 134. A susceptor is a material used for its ability to absorb the electromagnetic energy of microwaves and convert it to heat and to infrared thermal energy that is also re-emitted as infrared thermal radiation. Susceptance is considered an electrical property of materials that reflects their tendency to convert electromagnetic energy to thermal energy. The susceptor material 134 is bonded to at least a portion of the vessel 122, preferably the inner surface 132 is the portion of the vessel 122 that is at least partially coated with the susceptor material 134.

Bonding of the susceptor material 134 to the vessel 122 can be accomplished via well known methods including chemical bonding, heating, use of an intermediate material 140, brazing, soldering, and/or welding. For chemical bonding, the use of adhesive materials including aluminum oxide or silicon carbide can be utilized. For heating, processes such as high velocity burning gases or plasma can be applied to the surface to be treated while the susceptor materials in the form of powder fed into the passing flame. The susceptor materials would melt in the high temperature burning gas and when impacted on the target surface they form a metallic bond akin to welding to the surface. For the intermediate materials, the intermediate material can be one or more of glass, ceramic and Teflon.

The use of the susceptor material 134 in the apparatus 120 allows the susceptor material to heat up when exposed to microwaves which then in turn heats up the material 130 in the vessel 122. Accordingly, the material 130 will be heated up whether the material 130 is a di-polar material or a microwave transparent material.

Figure 4:
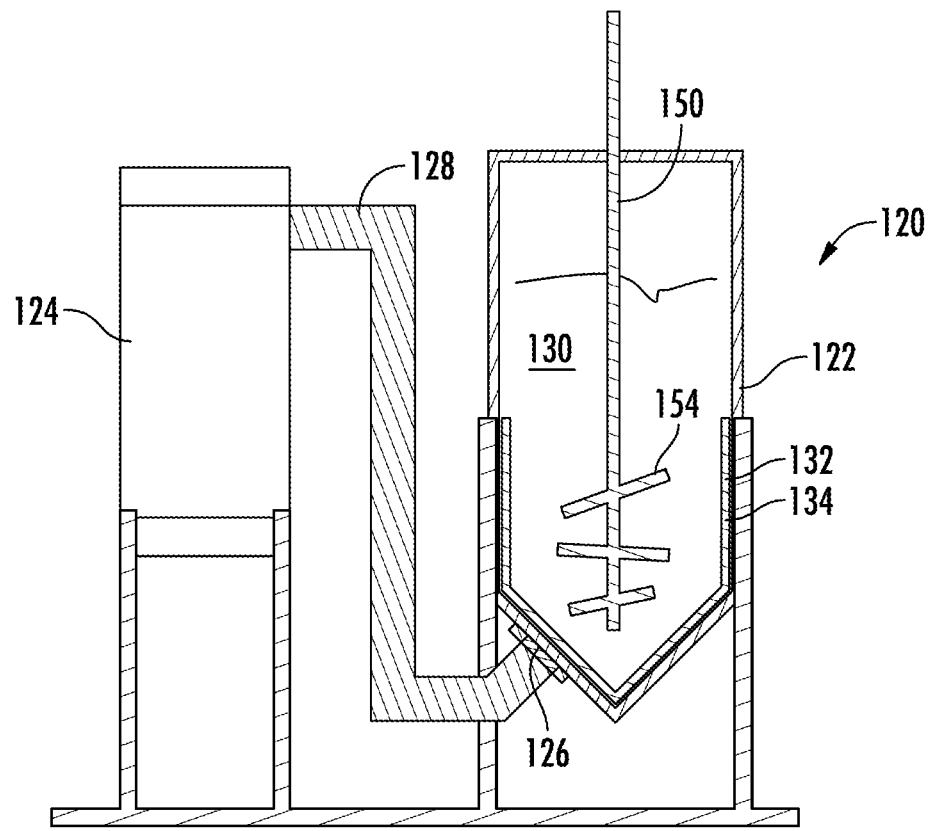
FIG. 4 is a third embodiment of a vessel with a portion of the vessel wall coated with a susceptor material and a turbine agitator coated with susceptor materials.
Figure 5:
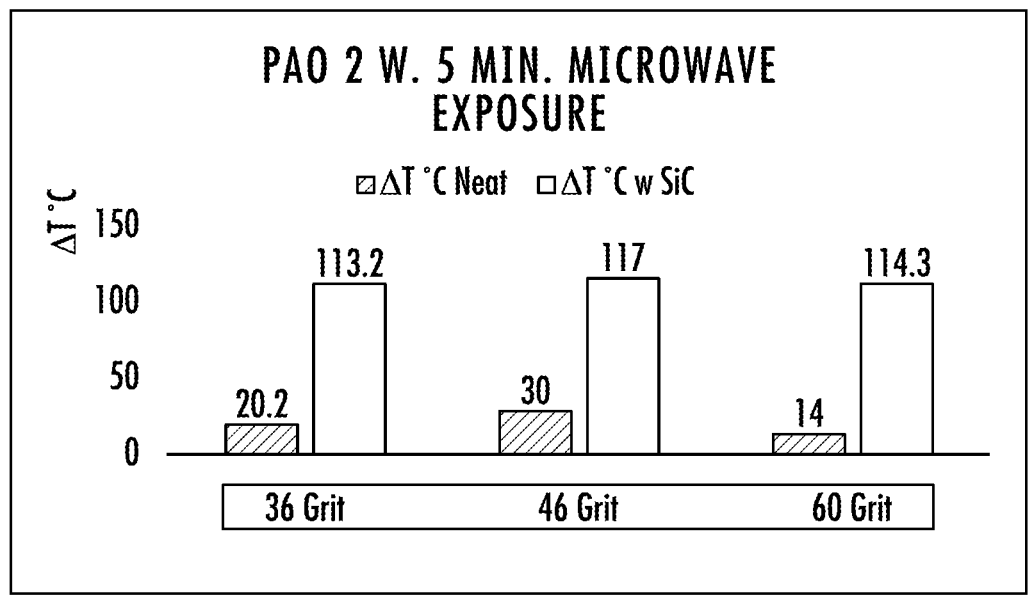
FIG. 5 is a chart showing temperature variations for a pure or neat PAO versus the same POA with SiC added when microwaved for five minutes.

FIGS. 4-5 show that mixing arms 150 can be used inside the vessel 122 to assist in mixing the material 130 and to assist in a consistent overall temperature of the entire material 130. The mixing arms 150 can include secondary arms 152 and 154 to assist in mixing. Furthermore, the mixing arms 150 and secondary arms 152 and 154 can also be coated with the susceptor material 134 in the same was as the vessel 122 to assist in heating.

In another embodiment, susceptor materials can be configured to be suspended in the material 130 to assist in heating of the material 130.

Figure 6:
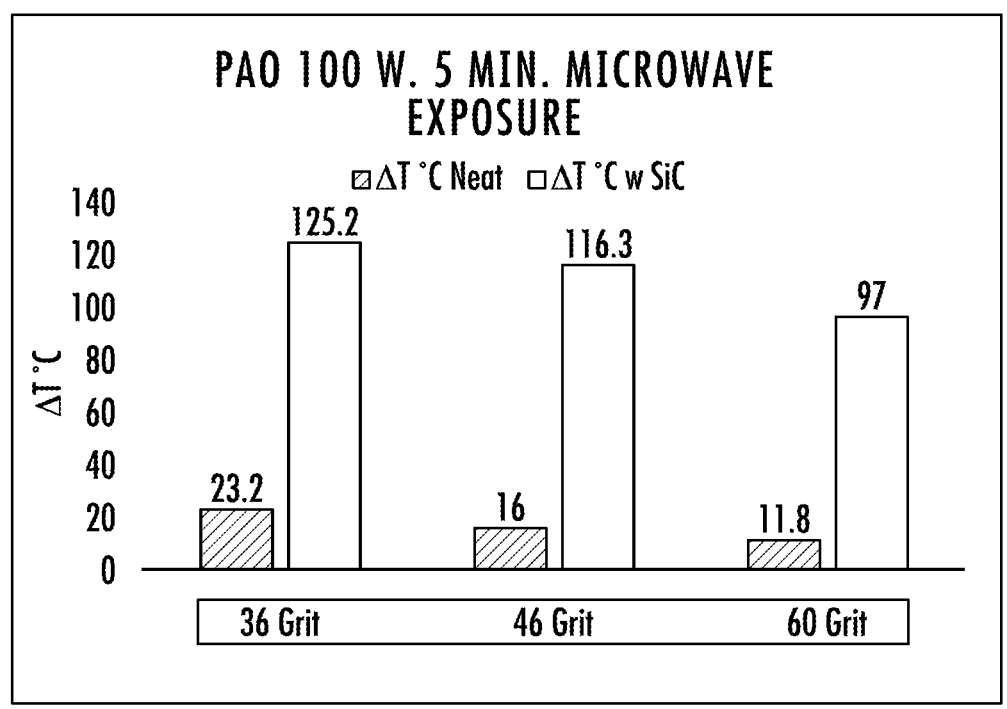
FIG. 6 is a chart showing temperature variations for a pure or neat second PAO versus the same second POA with SiC added when microwaved for five minutes.

FIGS. 5-6 are a comparison of liquid microwave transparent materials, one without a susceptor material and one with a susceptor material. The liquid materials were exposed to microwaves for five minutes at either a PAO 2 W or PAO 100 W. As seen in FIGS. 5-6, the liquid materials with the susceptor material had a much higher temperature than those without the susceptor materials.

It is to be understood that a process is described for heating the materials 130 that include introducing microwaves to a vessel wherein the vessel has a portion that contains a susceptor material. Further the process can include mixing the materials 130 and/or including susceptor material suspended in the materials 130.

Having thus described the invention in connection with the several embodiments thereof, it will be evident to those skilled in the art that various revisions can be made to the several embodiments described herein without departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. An apparatus for heating either a di-polar material or microwave transparent material, comprising:
   a microwave transmitter;
   a vessel;
   the vessel having an interior surface;
   at least a portion of the interior surface of the vessel is coated with a susceptor material;
   a mixing arm;
   the mixing arm configured to mix materials in the vessel.

2. The apparatus of claim 1, wherein:
   the susceptor material is bonded to the at least a portion of the interior surface via chemical bonding.

3. The apparatus of claim 1, wherein:
   the susceptor material is bonded to the at least a portion of the interior surface via heating.

4. The apparatus of claim 3, wherein:
   the heating is produced by a high velocity oxygen process.

5. The apparatus of claim 3, wherein:
   the heating is produced by a plasma process.

6. The apparatus of claim 1, wherein:
   the susceptor material is bonded to the at least a portion of the interior surface via an intermediate material.

7. The apparatus of claim 6, wherein:
   the intermediate material is glass.

8. The apparatus of claim 6, wherein:
   the intermediate material is ceramic.

9. The apparatus of claim 6, wherein:
   the intermediate material is Teflon.

10. The apparatus of claim 1, wherein:
    the susceptor material is bonded to the at least a portion of the interior surface via one or more of a brazing process, a soldering process, and a welding process.

11. The apparatus of claim 1, wherein:
    the mixing arm is coated with the susceptor material.

12. A process for heating a microwave transparent material, comprising the steps of:
    introducing microwaves into a vessel holding the microwave transparent material;
    wherein at least a portion of the vessel is coated with a susceptor material;
    mixing the microwave transparent material with a mixing arm.

13. The process of claim 12, wherein:
    the susceptor material is bonded to the at least a portion of the vessel via chemical bonding.

14. The process of claim 12, wherein:
    the susceptor material is bonded to the at least a portion of the vessel via heating.

15. The process of claim 12, wherein:
    the susceptor material is bonded to the at least a portion of the vessel via an intermediate material.

16. The process of claim 12, wherein:
    the susceptor material is bonded to the at least a portion of the vessel via one or more of a brazing process, a soldering process, and a welding process.

17. The process of claim 12, wherein:
    the mixing arm is coated with the susceptor material.

* * * * *